(12) United States Patent
Lu

(10) Patent No.: US 12,501,477 B2
(45) Date of Patent: Dec. 16, 2025

(54) TRANSMISSION PRIORITY DETERMINATION METHOD AND TERMINAL DEVICE

(71) Applicant: GUANGDONG OPPO MOBILE TELECOMMUNICATIONS CORP., LTD., Dongguan (CN)

(72) Inventor: Qianxi Lu, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 622 days.

(21) Appl. No.: 17/864,105

(22) Filed: Jul. 13, 2022

(65) Prior Publication Data

US 2022/0353882 A1 Nov. 3, 2022

Related U.S. Application Data

(63) Continuation of application No. PCT/CN2020/075137, filed on Feb. 13, 2020.

(51) Int. Cl.
H04W 72/566 (2023.01)
H04W 74/0833 (2024.01)

(52) U.S. Cl.
CPC ...... *H04W 72/569* (2023.01); *H04W 74/0833* (2013.01)

(58) Field of Classification Search
CPC .......... H04W 72/569; H04W 74/0833
USPC .......................................... 370/329
See application file for complete search history.

(56) References Cited

U.S. PATENT DOCUMENTS

2018/0234995 A1 8/2018 Jung et al.
2020/0037306 A1 1/2020 Seo

FOREIGN PATENT DOCUMENTS

| CN | 103874049 A | 6/2014 |
| CN | 106165517 A | 11/2016 |
| CN | 109548080 A | 3/2019 |
| CN | 109891987 A | 6/2019 |
| CN | 110536354 A | 12/2019 |
| CN | 110546975 A | 12/2019 |
| WO | 2016074416 A1 | 5/2016 |
| WO | 2018074876 A1 | 4/2018 |
| WO | 2018082571 A1 | 5/2018 |
| WO | 2020006366 A1 | 1/2020 |

OTHER PUBLICATIONS

Huawei, "Further discussion on NR SL and NR UL prioritization", R2-1913709, Oct. 14-Oct. 18, 2019. (From Applicant's IDS) (Year: 2019).*
CATT, "Remaining issues for Prioritization", R2-1914448, Nov. 18-22, 2019 (From Applicant's IDS) (Year: 2019).*

(Continued)

*Primary Examiner* — Mang Hang Yeung
(74) *Attorney, Agent, or Firm* — BAYES PLLC

(57) ABSTRACT

The present disclosure relates to a method and a terminal device for determining transmission priority. Wherein the method for determining transmission priority includes: obtaining, by a terminal device, corresponding priority rule according to data with highest priority in uplink data, and determining transmission order of the uplink data and sidelink data.

15 Claims, 4 Drawing Sheets

(56) References Cited

OTHER PUBLICATIONS

OPPO, "Left issues on UL/SL Prioritization for NR-V2X", R2-1914463, Nov. 18-Nov. 22, 2019 (From Applicant's IDS) (Year: 2019).*

International Search Report from the International Searching Authority Re. Application No. PCT/CN2020/075137, mailed Oct. 14, 2020, 4 pages.

Written Opinion of the International Searching Authority Re. Application No. PCT/CN2020/075137, mailed Oct. 14, 2020, 9 pages.

International Search Report from the International Searching Authority Re. Application No. PCT/CN2020/084249, mailed Nov. 10, 2020, 4 pages.

Written Opinion of the International Searching Authority Re. Application No. PCT/CN2020/084249, mailed Nov. 10, 2020, 8 pages.

"Left issues on UL/SL prioritization for NR-V2X", R2-1914463, Source: OPPO, 3GPP TSG-RAN WG2 Meeting #108, Reno, US, Nov. 18-Nov. 22, 2019, 7 pages.

Second Office Action issued in corresponding Chinese application No. 202211020762.9, mailed Nov. 15, 2023.

Decision of Rejection issued in corresponding Chinese application No. 202211020762.9, mailed Jan. 10, 2024.

Second Office Action issued in corresponding European application No. 20918228.6, mailed Jan. 24, 2024.

Extended European Search Report issued in corresponding European application No. 20918228.6, mailed Nov. 22, 2022.

Huawei et al., "Further discussion on NR SL and NR UL prioritization", R2-1913709, 3GPP TSG-RAN WG2 Meeting #107 bis ChongQing, China, Oct. 14-Oct. 18, 2019.

CATT, "Remaining Issues for Prioritization", R2-1914448, 3GPP TSG-RAN WG2 Meeting #108 Reno, USA, Nov. 18-22, 2019.

Decision of Reexamination issued in corresponding Chinese application No. 202211020762.9, mailed Jun. 17, 2024.

Third Office Action issued in corresponding European application No. 20918228.6, mailed Jul. 4, 2024.

Notice of Allowance issued in corresponding Chinese application No. 202211020762.9, mailed Jul. 4, 2024.

First Office Action issued in corresponding Chinese application No. 202211020762.9, mailed Aug. 16, 2023.

First Office Action issued in corresponding European application No. 20918228.6, mailed Jul. 24, 2023.

3GPP TSG-RAN WG2 Meeting #107bis R2-1912169; Chongqing, P.R. China, Oct. 14-18, 2019 Source: CATT; Title: Prioritization between UL and SL for NR V2X.

3GPP TSG-RAN WG2 Meeting #108 R2-1916466 Reno, United States, Nov. 18-22, 2019 Title: [Draft] Reply LS on UL-SL prioritization Response to: R2-1914318/R1-1911720; Release: Rel-16 Work Item: NR V2X; Source: OPPO [To be RAN2].

Communication pursuant to Article 94(3) EPC issued in corresponding European Application No. 20918228.6, mailed on Feb. 6, 2026, 5 pages.

* cited by examiner

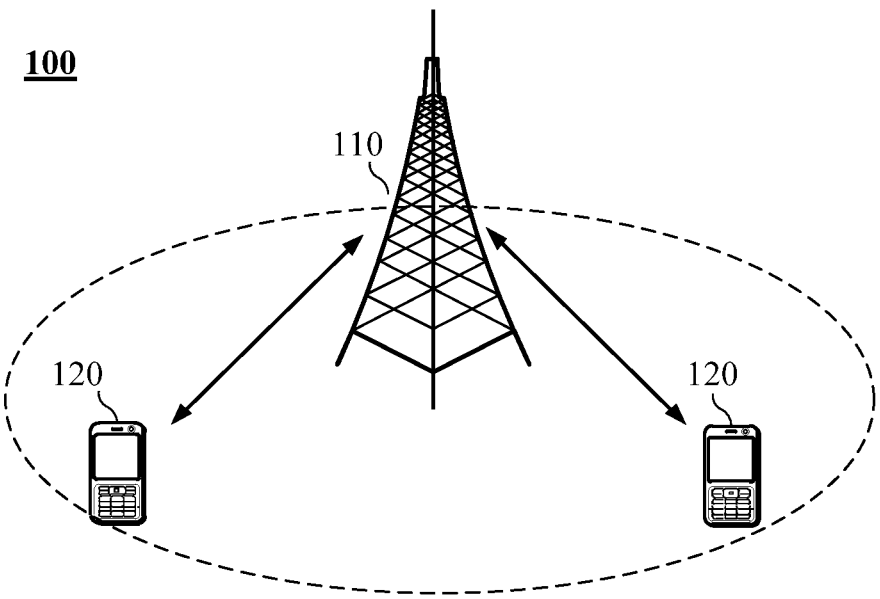

| obtaining, by a terminal device, corresponding priority rule according to data with highest priority in uplink data, and determining transmission order of the uplink data and sidelink data | ⌒S210 |

| obtaining, by the terminal device, the data with highest priority in the uplink data and data with highest priority in the sidelink data | ⌒S310 |

↓

| obtaining, by a terminal device, corresponding priority rule according to data with highest priority in uplink data, and determining transmission order of the uplink data and sidelink data | ⌒S210 |

S410 — in the uplink MAC PDU and the sidelink MAC PDU, the MAC CE or MAC SDU with the highest priority in the respective MAC PDUs are respectively selected as the comparison objects in the respective directions S420 — determining the MAC PDU on which direction is send preferentially according to the determined transmission priority rule applicable to the comparison objects, such as one of the above-mentioned transmission priority rule 1, priority rule 2a and priority rule

FIG. 4

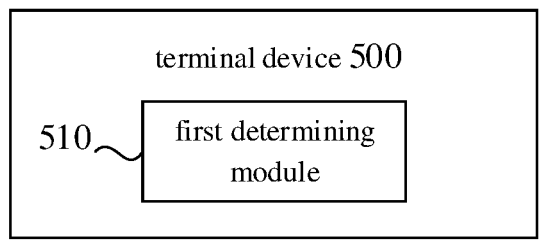

FIG. 5

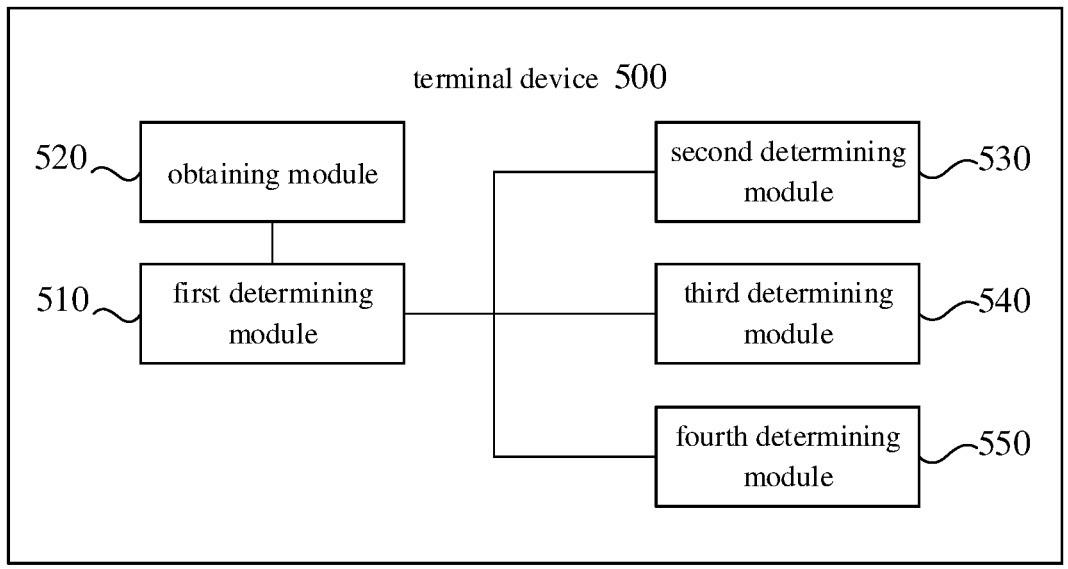

FIG. 6

TRANSMISSION PRIORITY DETERMINATION METHOD AND TERMINAL DEVICE

CROSS REFERENCE TO RELATED APPLICATION

The present application is a continuation of International Application No. PCT/CN2020/075137, filed on Feb. 13, 2020, the content of which is incorporated herein by reference in its entirety.

TECHNICAL FIELD

The present disclosure relates to the field of communication, and in particular, to a method and terminal device for determining transmission priority.

BACKGROUND

Uplink MAC (Media Access Control) PDU (Packet Data Unit) may include at the same time TYPE1 (first type) MAC CE (Control Element), TYPE 2 (second type) MAC CE and MAC SDU (Service Data Unit).

SUMMARY

Embodiment of the present disclosure provides a method and a terminal device for determining transmission priority.

Embodiment of the present disclosure provides a method for determining transmission priority, including:
  obtaining, by a terminal device, corresponding priority rule according to data with highest priority in uplink data, and determining transmission order of the uplink data and sidelink data.

Embodiment of the present disclosure provides a terminal device, including a processor and a memory. The memory is configured to store computer program, and the processor is configured to call and execute the computer program stored in the memory, to implement the above method for determining transmission priority.

Embodiment of the present disclosure provides a chip configured to implement the above method for determining transmission priority.

In particular, the chip includes a processor, configured to call and execute computer program from a memory, to cause a terminal mounted with the chip to implement the above method for determining transmission priority.

Embodiment of the present disclosure provides a computer readable storage medium configured to store a computer program, wherein the computer program causes a computer to implement the above method for determining transmission priority.

Embodiment of the present disclosure provides a computer program product including program instructions which cause a computer to implement the above method for determining transmission priority.

Embodiment of the present disclosure provides a computer program which when being executed by a computer causes the computer to implement the above method for determining transmission priority.

BRIEF DESCRIPTION OF THE DRAWINGS

FIG. 1 is a schematic diagram of an application scenario of an embodiment of the present disclosure.

FIG. 2 is a schematic flowchart of a method for determining transmission priority according to an embodiment of the present disclosure.

FIG. 3 is a schematic flowchart of a method for determining transmission priority according to another embodiment of the present disclosure.

FIG. 4 is a schematic flowchart of a method for determining transmission priority according to another embodiment of the present disclosure.

FIG. 5 is a schematic structural diagram of a terminal device according to an embodiment of the present disclosure.

FIG. 6 is a schematic structural diagram of a terminal device according to another embodiment of the present disclosure.

DETAILED DESCRIPTION

Figure 7:
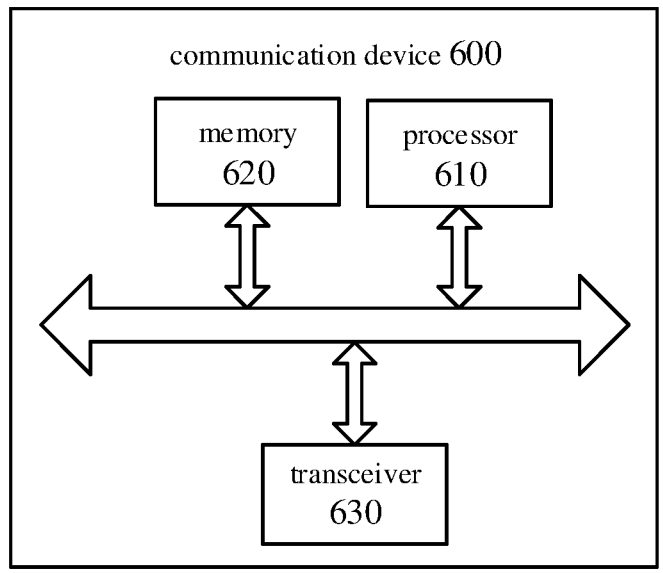
FIG. 7 is a schematic structural diagram of a communication device according to an embodiment of the present disclosure.

The technical solutions in the embodiments of the present disclosure will be described below with reference to the accompanying drawings in the embodiments of the present disclosure.

The implementation of the embodiments of the present disclosure may be applied to various communication systems, for example, a global system of mobile communication (GSM) system, a code division multiple access (CDMA) system, a wideband code division multiple access (WCDMA) system, general packet radio service (GPRS), long term evolution (LTE) system, advanced long term evolution (LTE-A) system, new radio (NR) system, evolution system of NR system, LTE-based access to unlicensed spectrum (LTE-U) system, NR-based access to unlicensed spectrum (NR-U) system, universal mobile telecommunication system (UMTS), wireless local area networks (WLAN), wireless fidelity (WiFi), next generation (5th-Generation, 5G) system or other communication systems, etc.

Generally, traditional communication systems support a limited number of connections and are easy to implement. However, with the development of communication technology, mobile communication systems will not only support traditional communication, but also support, for example, device to device (D2D) communication, machine to machine (M2M) communication, machine type communication (MTC), and vehicle to vehicle (V2V) communication, etc. The embodiments of the present disclosure can also be applied to these communications system.

Optionally, the communication system in this embodiment of the present disclosure can be applied to a carrier aggregation (CA) scenario, a dual connectivity (DC) scenario, and can also be applied to a standalone (SA) distribution scenario.

This embodiment of the present disclosure does not limit the applied spectrum. For example, the embodiments of the present disclosure may be applied to licensed spectrum, and may also be applied to unlicensed spectrum.

The embodiments of this disclosure describe various embodiments in conjunction with network equipment and terminal equipment, where: terminal equipment may also be referred to as user equipment (UE), access terminal, subscriber unit, subscriber station, mobile station, mobile station, remote station, remote terminal, mobile device, user terminal, terminal, wireless communication device, user agent or user device, etc. The terminal equipment can be a station (STAION, ST) in a WLAN, and can be a cellular phone, a wireless phone, a session initiation protocol (SIP) phone, a wireless local loop (WLL) station, a personal digital assistant (PDA) devices, handheld devices with wireless communication capabilities, computing devices or other processing devices connected to wireless modems, in-vehicle devices, wearable devices, and next-generation communication systems, such as terminal devices in NR networks or terminal devices in the future evolved public land mobile network (PLMN) network, etc.

As an example while not a limitation, in this embodiment of the present disclosure, the terminal device may also be a wearable device. Wearable devices can also be called wearable smart devices, which are the general term for the intelligent design of daily wear and the development of wearable devices using wearable technology, such as glasses, gloves, watches, clothing and shoes. A wearable device is a portable device that is worn directly on the body or integrated into the user's clothing or accessories. Wearable device is not only a hardware device, but also realizes powerful functions through software support, data interaction, and cloud interaction. In a broad sense, wearable smart devices may include devices with full-feature and large-size, and having complete or partial functions without relying on smart phones, such as smart watches or smart glasses, and devices only focus on a certain type of application function, which needs to cooperate with other devices such as smart phones, such as various kinds of smart bracelets, smart jewelry and the like for physical sign monitoring.

A network device can be a device used to communicate with a mobile device. The network device can be an access point (AP) in WLAN, a base transceiver station (BTS) in GSM or CDMA, or a WCDMA Base station (NodeB, NB), or an evolutional base station (Evolutional Node B, eNB or eNodeB) in LTE, or relay station or access point, or in-vehicle equipment, wearable equipment and NR network equipment (gNB), or network equipment in the PLMN network that evolves in the future.

In this embodiment of the present disclosure, a network device provides services for a cell, and a terminal device communicates with the network device through transmission resources (for example, frequency domain resources, or spectrum resources) used by the cell, and the cell may be a cell corresponding to a network device (for example, a base station), the cell can belong to a macro base station, or a base station corresponding to a small cell. In this embodiment, the small cell may include metro cell, micro cell, pico cell, femto cell, etc. These small cells have the characteristics of small coverage and low transmit power, and are suitable for providing high-speed data transmission services.

FIG. 1 exemplarily shows one network device 110 and two terminal devices 120. Optionally, the wireless communication system 100 may include a plurality of network devices 110, and the coverage of each network device 110 may include other numbers of the terminal device 120, which is not limited in this embodiment of the present disclosure.

Optionally, the wireless communication system 100 may further include other network entities such as a mobility management entity (MME), an access and mobility management function (AMF), which is not limited in this embodiment of the present disclosure.

It should be understood that the terms "system" and "network" are often used interchangeably herein. The term "and/or" in this disclosure is only an association relationship to describe the associated objects, indicating that there can be three kinds of relationships, for example, A and/or B, it can mean the three cases of only A, both A and B, and only B. In addition, the character "/" in this document generally indicates that the related objects are an "or" relationship.

FIG. 2 is a schematic flowchart of a method 200 for determining a transmission priority according to an embodiment of the present disclosure. The method can optionally be applied to the system shown in FIG. 1, but is not limited thereto. The method includes at least part of the following.

In S210, the terminal device obtains corresponding priority rule according to the data with the highest priority in the uplink data, and determines the transmission order of the uplink data and the sidelink data.

Specifically, the uplink data may include one kind of data or multiple kinds of data, and if the uplink data includes only one kind of data, it can be considered that the priority of the data is the highest. If the uplink data includes multiple types of data, it can be determined which data has the highest priority according to the type of data.

For example, the uplink data may be an uplink MAC (Medium Access Control) PDU (Packet Data Unit). If the uplink MAC PDU includes TYPE1 MAC CE (control element), and the uplink MAC PDU also includes TYPE2 MAC CE and/or MAC SDU (service data unit), it can be considered that the TYPE1 MAC CE has the highest priority.

For another example, if the uplink MAC PDU does not include the TYPE1 MAC CE or the TYPE2 MAC CE, but includes the MAC SDU, the MAC SDU has the highest priority.

For another example, if the uplink MAC PDU in the uplink MAC PDU only includes the TYPE2 MAC CE, the TYPE2 MAC CE has the highest priority.

In the case where the data to be sent includes uplink data and sidelink data, a corresponding priority rule can be determined according to the type of the highest priority data included in the uplink data, and then it can be determined according to the priority rule whether to send the uplink data or the sidelink data preferentially. In this embodiment of the present disclosure, data to be sent preferentially can be determined according to the priority rule, so the priority rule may also be referred to as a transmission priority rule.

Optionally, in the embodiment of the present disclosure, as shown in FIG. 3, in the method 200 for determining transmission priority, the method further includes: in S310, the terminal device obtains the data with the highest priority in the uplink data and the data with highest priority in the sidelink data.

Specifically, the data with the highest priority can be determined from the uplink data and the sidelink data, and then the data with the highest priority in the uplink data and the data with the highest priority in the sidelink data are compared using the priority rule corresponding to the data with the highest priority included in the uplink data, and then determine whether to send uplink data preferentially or send sidelink data preferentially.

Optionally, in this embodiment of the present disclosure, the method for determining the priority rule includes: in the case that the MAC SDU is the data with the highest priority in the uplink data, the priority rule is the first priority rule. For example, when the terminal device does not include TYPE1 MAC CE or TYPE2 MAC CE while includes MAC SDU in the uplink MAC PDU, the priority rule is the first priority rule. In this case, the highest priority data in the uplink MAC PDU is the MAC SDU, and the corresponding priority rule is the first priority rule.

Optionally, in this embodiment of the present disclosure, the first priority rule includes: when the uplink data is not prioritized in the uplink direction while the sidelink data is prioritized in the sidelink direction, the sidelink data is sent preferentially; otherwise, the uplink data is sent preferentially.

Optionally, in the embodiment of the present disclosure, after it is determined that the priority rule is the first priority rule, in S210, the terminal device determines the transmission order of the uplink data and sidelink data according to the priority rule corresponding to the data with the highest priority in the uplink data, which may include at least one of the followings.

Manner 1: According to the first priority rule, when the MAC SDU in the uplink MAC PDU is prioritized in the uplink direction, the terminal device ignores the sidelink MAC PDU and sends the upstream MAC PDU preferentially.

Optionally, in this embodiment of the present disclosure, the case in which the MAC SDU in the uplink MAC PDU is prioritized in the uplink direction includes at least one of the following:
  the MAC SDU having a priority value smaller than a first threshold is included in the uplink MAC PDU;
  the uplink MAC PDU is transmitted in a third message MESSAGE 3 in a random access process; and
  the uplink MAC PDU includes high-priority data required by the upper layer to be sent.

For example, the value of the priority in the uplink direction may range from 1 to 16, with a value of 1 being the highest priority. The first threshold may be 8. If the priority value of the MAC SDU included in the upstream MAC PDU is 3, which is smaller than the first threshold value of 8 in the uplink direction, the MAC SDU is prioritized in the uplink direction.

For another example, if the uplink MAC PDU is sent through MESSAGE 3 of the random access procedure, it can be considered that the MAC SDU in the uplink MAC PDU is prioritized in the uplink direction, without comparing the thresholds in the above example.

For another example, if the uplink MAC PDU includes high-priority data such as public safety data required to be sent by a higher layer, it may be considered that the MAC SDU in the uplink MAC PDU is prioritized in the uplink direction, without comparing the thresholds in the above example.

Manner 2: According to the first priority rule, the terminal device sends the sidelink MAC PDU preferentially when the MAC SDU in the uplink MAC PDU is not prioritized in the uplink direction and the sidelink MAC PDU is prioritized in the sidelink direction.

Manner 3: According to the first priority rule, the terminal device preferentially sends the uplink MAC PDU when the MAC SDU in the uplink MAC PDU is not prioritized in the uplink direction and the sidelink MAC PDU is not prioritized in the sidelink direction.

Optionally, in this embodiment of the present disclosure, the case in which the MAC SDU in the uplink MAC PDU is not prioritized in the uplink direction includes:
  the MAC SDU having a priority value equal to or greater than the first threshold is included in the uplink MAC PDU;
  the uplink MAC PDU is not transmitted in a third message MESSAGE 3 in a random access process; and
  the uplink MAC PDU does not include high-priority data required by the upper layer to be sent.

Optionally, in the embodiment of the present disclosure, the method for determining the priority rule includes: when the TYPE2 MAC CE is the data with the highest priority in the uplink data, the priority rule is the second priority rule. For example, if the terminal device only includes the second type TYPE2 MAC CE in the uplink MAC PDU, the priority rule is the second priority rule.

Optionally, in the embodiment of the present disclosure, the second priority rule includes: in the case that the sidelink data is prioritized in the sidelink direction, ignore the priority of the TYPE2 MAC CE in the uplink data, and send the sidelink data preferentially.

Optionally, in the embodiment of the present disclosure, after determining that the priority rule is the second priority rule, in S210, the terminal device determines the transmission order of the uplink data and sidelink data according to the priority rule corresponding to the data with the highest priority in the uplink data, which may include at least one of the followings.

Manner 4: According to the second priority rule, when the sidelink MAC PDU is prioritized in the sidelink direction, the terminal device ignores the priority of the TYPE2 MAC CE in the uplink MAC PDU and sends the sidelink MAC PDU preferentially.

Optionally, in this embodiment of the present disclosure, the case that the sidelink MAC PDU is prioritized in the sidelink direction includes: the sidelink MAC PDU includes a logical channel or MAC CE whose priority value is smaller than a second threshold. For example, the priority value in the sidelink direction can range from 1 to 8, with a value of 1 being the highest priority. The second threshold may be 4. If the value of the priority of the logical channel included in the sidelink MAC PDU is 2, which is smaller than the second threshold value of 4, the sidelink MAC PDU is prioritized in the sidelink direction.

Manner 5: According to the second priority rule, when the sidelink MAC PDU is not prioritized in the sidelink direction, the terminal device preferentially sends the uplink MAC PDU.

Optionally, in the embodiment of the present disclosure, the case where the sidelink MAC PDU is not prioritized in the sidelink direction is: the sidelink MAC PDU includes a logical channel or MAC CE whose priority value is greater than or equal to the second threshold.

Optionally, in the embodiment of the present disclosure, the TYPE2 MAC CE includes at least one of:
  MAC CE for recommended bit rate query;
  MAC CE for BSR included for padding;
  MAC CE for SL-BSR included for padding.

Optionally, in the embodiment of the present disclosure, the method for determining the priority rule includes: when the TYPE2 MAC CE is the data with the highest priority in the uplink data, the priority rule is the second priority rule. For example, when the terminal device includes the TYPE1 MAC CE in the uplink MAC PDU, the priority rule is a third priority rule.

Optionally, in this embodiment of the present disclosure, the third priority rule includes: the uplink transmission priority of the TYPE1 MAC CE is the highest.

Optionally, in this embodiment of the present disclosure, the terminal device determines the transmission order of the uplink data and sidelink data according to the priority rule corresponding to the data with the highest priority in the uplink data, which includes:

The terminal device sends the uplink MAC PDU preferentially according to the third priority rule.

Optionally, in this embodiment of the present disclosure, the TYPE1 MAC CE includes at least one of:
C-RNTI MAC CE;
configured grant confirmation MAC CE;
buffer status report (BSR);
SL BSR;
Power headroom report (PHR).

By adopting the method for determining the transmission priority in the embodiment of this method, and using the priority rule corresponding to the data with the highest priority in the uplink data, it can be more reasonably determined whether to send the uplink data preferentially or send the sidelink data preferentially, thereby avoiding the deadlock problem and making the transmission priority rules between uplink and sidelink more reasonable.

In the case that only TYPE2 MAC CE is included in the uplink data, using the second priority rule, when the sidelink data is prioritized in the sidelink direction, the sidelink data can be sent preferentially while only the priority of the TYPE2 MAC CE in the uplink data may be ignored. Therefore, deadlock can be avoided when TYPE1 MAC CE and TYPE2 MAC SDU are included in the uplink data.

In the case that the TYPE1 MAC CE is included in the uplink data, the third priority rule is used to directly send the uplink data in priority. Therefore, deadlock can be avoided when TYPE1 MAC CE and TYPE2 MAC SDU are included in the uplink data.

The following is an exemplary description of specific application scenarios of the embodiments of the present disclosure.

In 3GPP (3rd Generation Partnership Project), each logical channel in the MAC layer has a logical channel priority. The order of priority between MAC CEs and MAC SDUs including logical channels in the MAC layer is fixed. One MAC SDU carries one logical channel. The priority of the logical channel is the priority of the MAC SDU carrying the logical channel. Each logical channel has a priority value. The logical channels may include CCCH (Common Control CHannel), DCCH (Dedicated Control CHannel), DTCH (Dedicated Transmission CHannel) and the like.

The priority of the logical channel for sending the CCCH and the priority of the MAC CE including the C-RNTI (Cell Radio Network Temporary Identifier) are the highest. Between the TYPE2 MAC SDU and the highest priority are some MAC CEs, such as BSR (buffer status report), PHR (power headroom report) and so on. These are TYPE1 MAC CEs.

There are also some MAC CEs having priority lower than that of DCCH and DTCH, such as padding BSR, etc. These belong to TYPE2 MAC CE.

A priority threshold is also configured in the MAC layer protocol. If the value of the priority of the logical channel is smaller than the threshold, it can be considered that the logical channel is prioritized in the uplink direction. A priority threshold is also configured on the MAC layer of the sidelink. If the priority value of the MAC SDU or MAC CE of the logical channel on the sidelink is smaller than this threshold, the sidelink logical channel or MAC CE is considered to be prioritized in the sidelink direction.

If the terminal device has limited capabilities and cannot send data in both the uplink and sidelink directions at the same time, the following priority rules can be used to determine which data to send preferentially. If the uplink data is not prioritized in the uplink direction, while the sidelink data is prioritized in the sidelink direction, the terminal device will send the sidelink data preferentially, otherwise the uplink data will be sent preferentially. This rule may be referred to as transmission priority rule 1. The uplink data of the transmission priority rule 1 may not include the uplink MAC CE.

For uplink MAC CE, transmission priority rule 2 can be applied. If sidelink data is prioritized in the sidelink direction, regardless of the priority of the uplink MAC CE, the sidelink data is sent preferentially. The MAC CE in the transmission priority rule 2 includes TYPE1 MAC CE and TYPE2 MAC CE.

An important function of the MAC layer of 3GPP is the multiplexing function. That is, when the MAC layer generates MAC CEs and MAC SDUs, as long as the allocated radio resources are sufficient, these MAC CEs and MAC SDUs will be combined into one MAC PDU and sent together. A supplement to the transmission priority rule 1 is that when the MAC PDU is sent through the MESSAGE 3 in the random access process, or when the logical channel carries high-priority data required to be sent by the high-level protocol, it is considered that the uplink has prioritized. The comparison with the uplink threshold can be omitted.

If both TYPE1 MAC CE and TYPE2 MAC SDU are included in the uplink MAC PDU, a deadlock phenomenon will occur when a decision needs to be made between the upstream MAC PDU and the prioritized sidelink data packet. For example, the uplink MAC CE includes a BSR, the MAC SD carries a DTCH, and the priority value of the logical channel is smaller than the uplink priority threshold. Also, there is one MAC SDU in the sidelink direction, and the priority value of the logical channel thereof is smaller than the priority threshold of the sidelink. According to the MAC layer protocol, the priority of the BSR is fixed higher than that of the upstream MAC SDU. However, according to transmission priority rule 1, the upstream MAC SDU has a higher priority than the sidelink MAC SDU. According to the transmission priority rule 2, the priority of sidelink MAC SDU is higher than that of BSR. In this case, the UE does not know whether to send uplink data or sidelink data, and a deadlock phenomenon occurs.

In an example, the above-mentioned transmission priority rule 2 may be modified, for example, it is stipulated that the uplink MAC CE in the rule 2 is only applicable to the TYPE2 MAC CE. The modified rule can be called transmission priority rule 2a: if the sidelink data is prioritized in the sidelink direction, the sidelink data will be sent preferentially regardless of the priority of the uplink TYPE2 MAC CE. In addition, it can also be specified that the priority of the TYPE1 MAC CE is absolutely higher than that of the sidelink data, that is, regardless of whether the sidelink data is prioritized in the sidelink direction, the UE sends the TYPE1 MAC CE preferentially. This rule may be referred to as transmission priority rule 3.

In this way, the above-mentioned deadlock phenomenon can be addressed by adopting the transmission priority rule 3. Continuing to illustrate with the above example, according to the transmission priority rule 3, the priority of the BSR and the priority of the uplink MAC SDU are higher than the priority of the sidelink data, so the UE should send the uplink data preferentially.

In the above example, other combinations may also appear in the MAC PDU, for example, the value of the priority of the TYPE2 MAC SDU may be greater than or equal to the configured threshold. In this case, the priority of the sidelink data may be higher than that of the uplink MAC SDU. Therefore, not all MAC CEs or MAC SDUs are sent with higher priority than the sidelink. In this case, as shown in FIG. 4, in the method 400 for determining the transmission priority of this embodiment, the following steps may be used to determine the transmission priority.

In step S410, in the uplink MAC PDU and the sidelink MAC PDU, the MAC CE or MAC SDU with the highest priority in the respective MAC PDUs are respectively selected as the comparison objects in the respective directions.

In step S420, it is determined the MAC PDU on which direction is send preferentially according to the determined transmission priority rule applicable to the comparison objects, such as one of the above-mentioned transmission priority rule 1, priority rule 2a and priority rule 3.

Embodiment 1

At least TYPE1 MAC CE is included in the uplink MAC PDU. TYPE1 MAC CE includes but is not limited to C-RNTI MAC CE, Configured Grant Confirmation (resource pre-configuration confirmation) MAC CE, BSR, SL BSR, PHR, etc. It can be determined according to the TYPE1 MAC CE included in the uplink MAC PDU that the transmission priority rule 3 is applicable: the priority of the TYPE1 MAC CE is absolutely higher than that of the sidelink data.

In this embodiment, the uplink MAC PDU may also include other MAC SDUs and TYPE2 MAC CE. For the MAC PDU in the sidelink direction, the content is not limited.

Then, according to the transmission priority rule 3, the priority of the TYPE1 MAC CE is absolutely higher than the sidelink data, so the uplink direction prioritized, and the uplink MAC PDU is sent preferentially.

Embodiment 2

The TYPE1 MAC CE is not included in the uplink MAC PDU, but at least the MAC SDU with the priority value smaller than the threshold is included, or the MAC PDU is sent through MESSAGE 3 of the random access process, or the MAC PDU includes the high priority data required to be sent by the high layer. Therefore, it can be determined that the highest priority data included in the uplink MAC PDU is the MAC SDU, so it is determined that the transmission priority rule 1 is applicable: if the uplink data is not prioritized in the uplink direction, and the sidelink data is prioritized in the sidelink direction, the terminal device will send the sidelink data preferentially, otherwise, it will send the uplink data preferentially.

The uplink MAC PDU includes at least the MAC SDU whose priority value is smaller than the threshold, or the MAC PDU is sent through MESSAGE 3 of the random access process, or the MAC PDU includes high-priority data required by the upper layer to be sent, indicating the MAC SDU of the uplink MAC PDU is prioritized in the uplink direction.

In this embodiment, MAC PDU exists in the sidelink direction, and the content thereof is not limited.

Therefore, according to the transmission priority rule 1, the MAC SDU of the uplink MAC PDU is prioritized, and the uplink MAC PDU is sent preferentially.

Embodiment 3

The uplink MAC PDU does not include the TYPE1 MAC CE, nor does it include the MAC SDU whose priority value is smaller than the threshold, nor does the MAC PDU be sent through MESSAGE 3 of the random access process, nor does the MAC PDU include the high priority data required to be sent by the higher layer, while it includes MAC SDUs with a priority value greater than or equal to the threshold. It can be determined first that the highest priority data included in the uplink MAC PDU is the MAC SDU, so it is determined that the transmission priority rule 1 is applicable: if the uplink data is not prioritized in the uplink direction, and the sidelink data is prioritized in the sidelink direction, the terminal device will sent the sidelink data preferentially, otherwise the uplink data will be sent preferentially.

The uplink MAC PDU does not include the MAC SDU whose priority value is smaller than the threshold, nor does the MAC PDU be sent through MESSAGE 3 of the random access process, nor does the MAC PDU include high-priority data required by the upper layer to be sent, while it includes MAC SDUs with a priority value greater than or equal to the threshold, this indicates that uplink data is not prioritized in the uplink direction.

In this embodiment, there is a MAC PDU in the sidelink direction, and the content includes a logical channel or MAC CE whose priority value is smaller than the sidelink threshold, indicating that the sidelink data is prioritized in the sidelink direction.

According to the transmission priority rule 1, since the uplink data is not prioritized in the uplink direction, and the sidelink data is prioritized in the sidelink direction, the MAC PDU of the sidelink is preferentially transmitted.

Embodiment 4

The uplink MAC PDU does not include the TYPE1 MAC CE, nor does it include the MAC SDU whose priority value is smaller than the threshold, nor does the MAC SDU be sent through MESSAGE 3 of the random access process, nor does the MAC SDU include the high priority data required by the higher layer to be sent, while including MAC SDUs with a priority value greater than or equal to the threshold. It can be determined first that the highest priority data included in the uplink MAC PDU is the MAC SDU, so it is determined that the transmission priority rule 1 is applicable: if the uplink data is not prioritized in the uplink direction, and the sidelink data is prioritized in the sidelink direction, the terminal device will send the sidelink data preferentially, otherwise the uplink data will be sent preferentially.

The uplink MAC PDU does not include the MAC SDU whose priority value is smaller than the threshold, nor does the MAC PDU be sent through MESSAGE 3 of the random access process, nor does the MAC PDU include high-priority data required by the upper layer to be sent, while it includes MAC SDUs with a priority value greater than or equal to the threshold, this indicates that uplink data is not prioritized in the uplink direction.

In this embodiment, there is a MAC PDU in the sidelink direction, and the content includes a logical channel or MAC CE whose priority value is greater than or equal to the sidelink threshold, indicating that the sidelink data is not prioritized in the sidelink direction.

According to the transmission priority rule 1, since the uplink data is not prioritized in the uplink direction, and the sidelink data is not prioritized in the sidelink direction, the MAC PDU of the sidelink is preferentially transmitted, it is also considered that the uplink direction is prioritized, and the uplink MAC PDU is sent preferentially.

Embodiment 5

Only TYPE2 MAC CE is included in the uplink MAC PDU. The TYPE2 MAC CE includes but is not limited to MAC CE for recommended bit rate query (MAC CE for recommended bit rate query), MAC CE for BSR included for padding (MAC CE for additional buffer status report), MAC CE for SL-BSR included for padding (MAC CE for additional sidechain cache status report). The applicable transmission priority rule 2a can be determined according to the fact that only the TYPE2 MAC CE is included in the uplink MAC PDU: if the sidelink data is given priority in the sidelink direction, regardless of the priority of the uplink TYPE2 MAC CE, the sidelink data will be sent preferentially.

In this embodiment, there is a MAC PDU in the sidelink direction, and the content includes a logical channel or MAC CE whose priority value is smaller than the sidelink threshold, indicating that the sidelink data is prioritized in the sidelink direction.

According to the transmission priority rule 2a, the sidelink data is prioritized in the sidelink direction and the TYPE2 MAC CE in the uplink MAC PDU is ignored, and the sidelink MAC PDU is transmitted preferentially.

Embodiment 6

Only TYPE2 MAC CE is included in the uplink MAC PDU. The TYPE2 MAC CE includes but is not limited to MAC CE for recommended bit rate query, MAC CE for BSR included for padding, MAC CE for SL-BSR included for padding. The applicable transmission priority rule 2a can be determined according to the fact that only the TYPE2 MAC CE is included in the uplink MAC PDU: if the sidelink data is given priority in the sidelink direction, regardless of the priority of the uplink TYPE2 MAC CE, the sidelink data will be sent preferentially.

In this embodiment, there is a MAC PDU in the sidelink direction, and the content includes a logical channel or MAC CE whose priority value is greater than or equal to the sidelink threshold, indicating that the sidelink data is not prioritized in the sidelink direction.

According to the transmission priority rule 2a, the sidelink data is not prioritized in the sidelink direction, thus the uplink direction is prioritized, and the uplink MAC PDU is transmitted preferentially.

By adopting the method for determining the transmission priority of each embodiment of the method, the above-mentioned deadlock problem can be avoided, so that the transmission priority rule between the uplink and the sidelink is more reasonable.

FIG. 5 is a schematic structural diagram of a terminal device according to an embodiment of the present disclosure. The terminal device 500 may include the following.

A first determining module 510 is configured to determine transmission order of the uplink data and sidelink data according to the priority rule corresponding to the data with highest priority in uplink data.

Optionally, in the embodiment of the present disclosure, as shown in FIG. 6, the terminal device may further include the following.

An obtaining module 520 is configured to obtain the data with highest priority in the uplink data and data with highest priority in the sidelink data.

Optionally, in the embodiment of the present disclosure, the terminal device may further include the following.

A second determining module 530 is configured to determine that the priority rule includes: in a case where MAC SDU is the data with highest priority in the uplink data, the priority rule is a first priority rule.

Optionally, in the embodiment of the present disclosure, the second determining module is further configured to, in the case that the uplink MAC PDU does not include the TYPE1 MAC CE or the TYPE2 MAC CE while includes the MAC SDU, the priority rule is the first priority rule.

Optionally, in the embodiment of the present disclosure, the first priority rule includes: in a case where the uplink data is not prioritized in the uplink direction and the sidelink data is prioritized in the sidelink direction, sending the sidelink data preferentially; and otherwise sending the uplink data preferentially.

Optionally, in the embodiment of the present disclosure, the first determining module 510 is further configured to send the uplink MAC PDU preferentially and ignore sidelink MAC PDU, according to the first priority rule, in a case where the MAC SDU in the uplink MAC PDU is prioritized in the uplink direction.

Optionally, in the embodiment of the present disclosure, the case where the MAC SDU in the uplink MAC PDU is prioritized in the uplink direction comprises at least one of:
the MAC SDU having a priority value smaller than a first threshold is included in the uplink MAC PDU;
the uplink MAC PDU is transmitted in a third message MESSAGE 3 in a random access process; and
the uplink MAC PDU comprises high-priority data required by the upper layer to be sent.

Optionally, in the embodiment of the present disclosure, the first determining module 510 is further configured to send the sidelink MAC PDU preferentially, according to the first priority rule, in a case where the MAC SDU in the uplink MAC PDU is not prioritized in the uplink direction while the sidelink MAC PDU is prioritized in the sidelink direction.

Optionally, in the embodiment of the present disclosure, the first determining module 510 is further configured to send the uplink MAC PDU preferentially, according to the first priority rule, in a case where the MAC SDU in the uplink MAC PDU is not prioritized in the uplink direction while the sidelink MAC PDU is not prioritized in the sidelink direction.

Optionally, in the embodiment of the present disclosure, the case where the MAC SDU in the uplink MAC PDU is not prioritized in the uplink direction includes:
the MAC SDU having a priority value greater than or equal to a first threshold is included in the uplink MAC PDU;
the uplink MAC PDU is not transmitted in a third message MESSAGE 3 in a random access process; and
the uplink MAC PDU does not comprise high-priority data required by the upper layer to be sent.

Optionally, in the embodiment of the present disclosure, the terminal device may further include the following.

A third determining module 540 is configured to determine that the priority rule includes: in a case where TYPE2 MAC CE is the data with highest priority in the uplink data, the priority rule is a second priority rule.

Optionally, in the embodiment of the present disclosure, the third determining module is further configured to: in a case where the uplink MAC PDU includes only the TYPE2 MAC CE, the TYPE2 MAC CE is the data with highest priority in the uplink data, and the priority rule is the second priority rule.

Optionally, in the embodiment of the present disclosure, the second priority rule includes: in a case where the sidelink data is prioritized in the sidelink direction, sending the sidelink data preferentially and ignoring the priority of the TYPE2 MAC CE in the uplink data.

Optionally, in the embodiment of the present disclosure, the first determining module 510 is further configured to: in a case where the sidelink MAC PDU is prioritized in the sidelink direction, send the sidelink MAC PDU preferentially and ignore the priority of the TYPE2 MAC CE in the uplink MAC PDU.

Optionally, in the embodiment of the present disclosure, the case where the sidelink MAC PDU is prioritized in the sidelink direction includes: the sidelink MAC PDU comprises a logical channel or an MAC CE having a priority value smaller than a second threshold.

Optionally, in the embodiment of the present disclosure, the first determining module 510 is further configured to: in a case where the sidelink MAC PDU is not prioritized in the sidelink direction, send the uplink MAC PDU preferentially, according to the second priority rule.

Optionally, in the embodiment of the present disclosure, the case where the sidelink MAC PDU is not prioritized in the sidelink direction is: the sidelink MAC PDU comprises a logical channel or an MAC CE having a priority value greater than or equal to a second threshold.

Optionally, in the embodiment of the present disclosure, the TYPE2 MAC CE includes at least one of:
MAC CE for recommended bit rate query;
MAC CE for BSR included for padding;
MAC CE for SL-BSR included for padding.

Optionally, in the embodiment of the present disclosure, the terminal device further includes the following.

A fourth determining module 550 is configured to determine that the priority rule includes: in a case where TYPE1 MAC CE is the data with highest priority in the uplink data, the priority rule is a third priority rule.

Optionally, in the embodiment of the present disclosure, the fourth determining module is further configured to determine that the priority rule is the third priority rule in a case where the uplink MAC PDU comprises the TYPE1 MAC CE.

Optionally, in the embodiment of the present disclosure, the third priority rule includes: the TYPE1 MAC CE has highest uplink transmission priority.

Optionally, in the embodiment of the present disclosure, the first determining module is further configured to: determine to send, by the terminal device, the uplink MAC PDU preferentially, according to the third priority rule.

Optionally, in the embodiment of the present disclosure, the TYPE1 MAC CE includes at least one of:
cell radio network temporary identification C-RNTI MAC CE;
configured grant confirmation MAC CE;
BSR;
SL BSR;
PHR.

By adopting the terminal device for determining the transmission priority in the embodiment of this method, and using the priority rule corresponding to the data with the highest priority in the uplink data, it can be more reasonably determined whether to send the uplink data preferentially or send the sidelink data preferentially, thereby avoiding the deadlock problem and making the transmission priority rules between uplink and sidelink more reasonable.

In the case that only TYPE2 MAC CE is included in the uplink data, using the second priority rule, when the sidelink data is prioritized in the sidelink direction, the sidelink data can be sent preferentially while only the priority of the TYPE2 MAC CE in the uplink data may be ignored. Therefore, deadlock can be avoided when TYPE1 MAC CE and TYPE2 MAC SDU are included in the uplink data.

In the case that the TYPE1 MAC CE is included in the uplink data, the third priority rule is used to directly send the uplink data in priority. Therefore, deadlock can be avoided when TYPE1 MAC CE and TYPE2 MAC SDU are included in the uplink data.

It should be understood that the above and other operations and/or functions of the various units in the terminal device according to the embodiments of the present disclosure are respectively to implement the corresponding processes of the terminal device in the method 200 and the method 400 in the above-mentioned embodiments. This will not be repeated here for conciseness.

FIG. 7 is a schematic structural diagram of a communication device 600 according to an embodiment of the present disclosure. The communication device 600 shown in FIG. 7 includes a processor 610, and the processor 610 can call and run a computer program from a memory, so as to implement the method in the embodiment of the present disclosure.

Optionally, as shown in FIG. 7, the communication device 600 may further include a memory 620. The processor 610 may call and run a computer program from the memory 620 to implement the methods in the embodiments of the present disclosure.

The memory 620 may be a separate element independent of the processor 610, or may be integrated in the processor 610.

Optionally, as shown in FIG. 7, the communication device 600 may further include a transceiver 630, and the processor 610 may control the transceiver 630 to communicate with other devices, specifically, may send information or data to other devices, or receive information or data sent by other devices.

The transceiver 630 may include a transmitter and a receiver. The transceiver 630 may further include antennas, and the number of the antennas may be one or more.

Optionally, the communication device 600 may be a terminal device in the embodiments of the present disclosure, and the communication device 600 may implement the corresponding processes implemented by the terminal device in each method in the embodiments of the present disclosure, which is not repeated here for conciseness.

Figure 8:
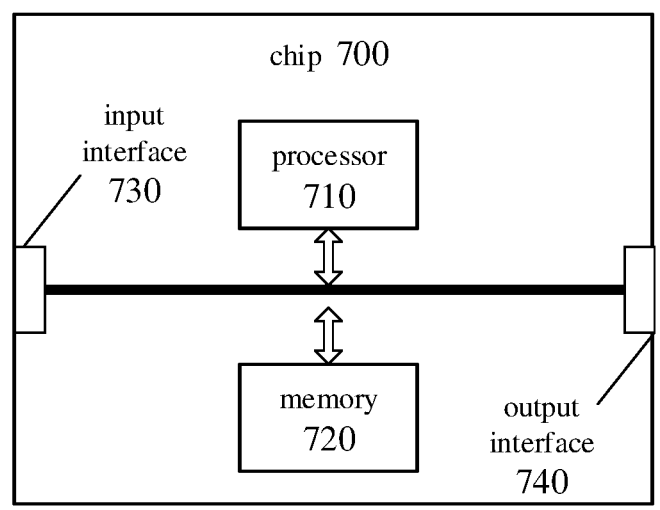
FIG. 8 is a schematic structural diagram of a chip according to an embodiment of the present disclosure.

FIG. 8 is a schematic structural diagram of a chip 700 according to an embodiment of the present disclosure. The chip 700 shown in FIG. 8 includes a processor 710, and the processor 710 can call and run a computer program from a memory, so as to implement the method in this embodiment of the present disclosure.

Optionally, as shown in FIG. 8, the chip 700 may further include a memory 720. The processor 710 may call and run a computer program from the memory 720 to implement the methods in the embodiments of the present disclosure.

The memory 720 may be a separate element independent of the processor 710, or may be integrated in the processor 710.

Optionally, the chip 700 may further include an input interface 730. The processor 710 may control the input interface 730 to communicate with other devices or chips, and specifically, may acquire information or data sent by other devices or chips.

Optionally, the chip 700 may further include an output interface 740. The processor 710 may control the output interface 740 to communicate with other devices or chips, and specifically, may output information or data to other devices or chips.

Optionally, the chip may be applied to the terminal device in the embodiments of the present disclosure, and the chip may implement the corresponding processes implemented by the terminal device in each method in the embodiments of the present disclosure, which is not repeated here for conciseness.

It should be understood that the chip mentioned in the embodiments of the present disclosure may also be referred to as a system level chip, a system chip, a chip system, or a system-on-chip, or the like.

The processor mentioned above may be a general-purpose processor, a digital signal processor (DSP), a field programmable gate array (FPGA), an application specific integrated circuit (ASIC) or other programmable logic devices, transistor logic devices, discrete hardware components, etc. The general-purpose processor mentioned above may be a microprocessor or any general processor or the like.

The above-mentioned memory may be volatile memory or non-volatile memory, or may include both volatile and non-volatile memory. The non-volatile memory may be read-only memory (ROM), programmable read-only memory (PROM), erasable programmable read-only memory (EPROM), electrically erasable programmable read-only memory (electrically EPROM, EEPROM) or flash memory. Volatile memory may be random access memory (RAM).

It should be understood that the above-mentioned memory is an exemplary but non-limiting description. For example, the memory in the embodiment of the present disclosure may also be a static random access memory (static RAM, SRAM), a dynamic random access memory (dynamic RAM, DRAM), synchronous dynamic random access memory (synchronous DRAM, SDRAM), double data rate synchronous dynamic random access memory (double data rate SDRAM, DDR SDRAM), enhanced synchronous dynamic random access memory (enhanced SDRAM, ESDRAM), synchronous link dynamic random access memory (synch link DRAM, SLDRAM) and direct rambus random access memory (Direct Rambus RAM, DR RAM) and so on. That is, the memory in the embodiments of the present disclosure is intended to include but not limited to these and any other suitable types of memory.

Figure 9:
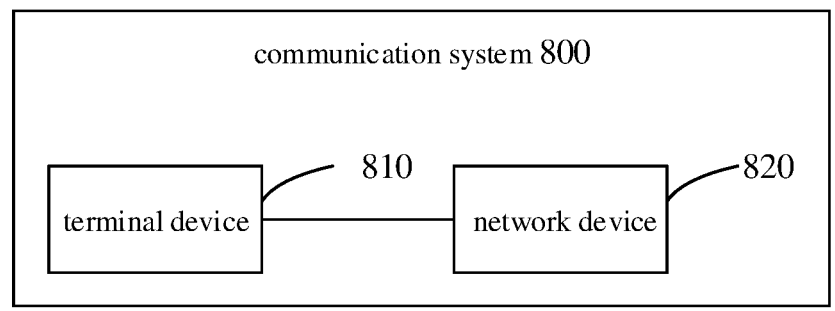
FIG. 9 is a schematic diagram of a communication system according to an embodiment of the present disclosure.

FIG. 9 is a schematic block diagram of a communication system 800 according to an embodiment of the present application. As shown in FIG. 9, the communication system 800 includes a terminal device 810 and a network device 820.

The terminal device 810 determines the transmission order of the uplink data and the sidelink data according to the priority rule corresponding to the data with the highest priority in the uplink data.

The terminal device 810 may be used to implement the corresponding functions implemented by the terminal device in the above method. For brevity, details are not repeated here.

In the above-mentioned embodiments, it may be implemented in whole or in part by software, hardware, firmware or any combination thereof. When implemented in software, it can be implemented in whole or in part in the form of a computer program product. The computer program product includes one or more computer instructions. When the computer program instructions are loaded and executed on a computer, all or part of the processes or functions described in the embodiments of the present disclosure are generated. The computer may be a general-purpose computer, a dedicated computer, a computer network, or other programmable device. The computer instructions may be stored on or transmitted from one computer readable storage medium to another computer readable storage medium, for example, the computer instructions may be transmitted from a website site, a computer, a server or a data center to another website site, computer, server or data center in a wired (e.g. coaxial cable, optical fiber, Digital Subscriber Line (DSL)) manner or a wireless (e.g. infrared, wireless, microwave, etc.) manner. The computer-readable storage medium can be any available medium that can be accessed by a computer or a data storage device such as a server, a data center, etc. that includes one or more available media integrated. The available media may be magnetic media (e.g., floppy disks, hard disks, magnetic tapes), optical media (e.g., DVD), or semiconductor media (e.g., Solid State Disk (SSD)), or the like.

It should be understood that, in various embodiments of the present disclosure, the magnitude of the sequence numbers of the above-mentioned processes does not mean the order of execution, and the execution order of each process should be determined by its functions and internal logic, and should not should not constitute any limitation on the implementation process of the embodiments of the present disclosure.

Those skilled in the art can clearly understand that, for the convenience and conciseness of description, for the specific operating process of the above-described systems, devices and units, reference may be made to the corresponding processes in the foregoing method embodiments, which will not be repeated here.

The above are only specific embodiments of the present disclosure, but the protection scope of the present disclosure is not limited to this. Any person skilled in the art can easily think of changes or substitutions within the technical scope disclosed in this disclosure, which should be covered by the protection scope of this disclosure. Therefore, the protection scope of the present disclosure shall be subject to the protection scope of the claims.

What is claimed is:

1. A method for determining transmission priority, comprising:
obtaining, by a terminal device, corresponding priority rule according to data with highest priority in uplink data, and determining transmission order of the uplink data and sidelink data,
wherein in response to MAC SDU being the data with highest priority in the uplink data, the priority rule is a first priority rule, and in response to TYPE1 MAC CE being the data with highest priority in the uplink data, the priority rule is a third priority rule, and wherein in response to uplink MAC PDU of the terminal device comprising the TYPE1 MAC CE, the TYPE1 MAC CE is the data with highest priority in the uplink data,
wherein obtaining, by the terminal device, corresponding priority rule according to the data with highest priority in the uplink data, and determining transmission order of the uplink data and sidelink data comprises:
sending, by the terminal device according to the first priority rule, the uplink MAC PDU preferentially in response to the MAC SDU in the uplink MAC PDU being prioritized in the uplink direction, and sending, by the terminal device, the uplink MAC PDU preferentially, according to the third priority rule,
wherein the MAC SDU in the uplink MAC PDU being prioritized in the uplink direction comprises at least one of:
a priority value of a logical channel of the MAC SDU in the uplink MAC PDU being smaller than a first threshold; or
the uplink MAC PDU is transmitted in a third message MESSAGE 3 in a random access process.

2. The method according to claim 1, further comprising:
obtaining, by the terminal device, the data with highest priority in the uplink data and data with highest priority in the sidelink data.

3. The method according to claim 1, wherein in response to uplink medium access control MAC packet data unit PDU not comprising first type TYPE1 MAC control element CE while comprises MAC service data unit SDU, the MAC SDU is the data with highest priority in the uplink data.

4. The method according to claim 1, wherein the first priority rule comprises: in response to the uplink data not being prioritized in the uplink direction and the sidelink data being prioritized in the sidelink direction, sending the sidelink data preferentially; and otherwise sending the uplink data preferentially.

5. The method according to claim 1, wherein obtaining, by the terminal device, corresponding priority rule according to data with highest priority in uplink data, and determining transmission order of the uplink data and sidelink data comprises: in response to the MAC SDU in the uplink MAC PDU not being prioritized in the uplink direction while the sidelink MAC PDU being prioritized in the sidelink direction, sending, by the terminal device, the sidelink MAC PDU preferentially, according to the first priority rule.

6. The method according to claim 1, wherein obtaining, by the terminal device, corresponding priority rule according to data with highest priority in uplink data, and determining transmission order of the uplink data and sidelink data comprises: in response to the MAC SDU in the uplink MAC PDU not being prioritized in the uplink direction while the sidelink MAC PDU not being prioritized in the sidelink direction, sending, by the terminal device, the uplink MAC PDU preferentially, according to the first priority rule.

7. The method according to claim 1, wherein the TYPE1 MAC CE comprises at least one of:
cell radio network temporary identification C-RNTI MAC CE;
configured grant confirmation MAC CE;
BSR;
SL BSR; and
power headroom report PHR.

8. A terminal device comprising: a processor and a memory, wherein the memory is configured to store computer program and the processor is configured to call and execute the computer program stored in the memory, to cause the terminal device to:
obtain corresponding priority rule according to data with highest priority in uplink data, and determine transmission order of the uplink data and sidelink data,
wherein in response to MAC SDU being the data with highest priority in the uplink data, the priority rule is a first priority rule, and in response to TYPE1 MAC CE being the data with highest priority in the uplink data, the priority rule is a third priority rule, and wherein in response to uplink MAC PDU of the terminal device comprising the TYPE1 MAC CE, the TYPE1 MAC CE is the data with highest priority in the uplink data,
wherein the terminal is further caused to:
send, according to the first priority rule, the uplink MAC PDU preferentially in response to the MAC SDU in the uplink MAC PDU being prioritized in the uplink direction, and send the uplink MAC PDU preferentially according to the third priority rule,
wherein the MAC SDU in the uplink MAC PDU being prioritized in the uplink direction comprises at least one of:
a priority value of a logical channel of the MAC SDU in the uplink MAC PDU being smaller than a first threshold; or
the uplink MAC PDU is transmitted in a third message MESSAGE 3 in a random access process.

9. The terminal device according to claim 8, wherein the terminal device is further caused to:
obtain the data with highest priority in the uplink data and data with highest priority in the sidelink data.

10. The terminal device according to claim 8, wherein the terminal device is further caused to: in response to the MAC SDU in the uplink MAC PDU not being prioritized in the uplink direction while the sidelink MAC PDU being prioritized in the sidelink direction, send the sidelink MAC PDU preferentially according to the first priority rule.

11. The terminal device according to claim 8, wherein the terminal device is further caused to: determine that the priority rule is the first priority rule, in response to uplink medium access control MAC packet data unit PDU not comprising first type TYPE1 MAC control element CE and second type TYEP2 MAC CE while comprises MAC service data unit SDU.

12. The terminal device according to claim 8, wherein the first priority rule comprises:
in response to the uplink data not being prioritized in the uplink direction and the sidelink data being prioritized in the sidelink direction, sending the sidelink data preferentially; and otherwise sending the uplink data preferentially.

13. The terminal device according to claim 8, wherein the terminal device is further caused to in response to the MAC SDU in the uplink MAC PDU not being prioritized in the uplink direction while the sidelink MAC PDU not being prioritized in the sidelink direction, send the uplink MAC PDU preferentially according to the first priority rule.

14. The terminal device according to claim 8, wherein the TYPE1 MAC CE comprises at least one of:
cell radio network temporary identification C-RNTI MAC CE;
configured grant confirmation MAC CE;
BSR;
SL BSR; and
power headroom report PHR.

15. A chip comprising a processor configured to call and execute a computer program stored in a memory, to cause a device installed with the chip to obtain corresponding priority rule according to data with highest priority in uplink data, and determine transmission order of the uplink data and sidelink data,
wherein in response to MAC SDU being the data with highest priority in the uplink data, the priority rule is a first priority rule, and in response to TYPE1 MAC CE being the data with highest priority in the uplink data, the priority rule is a third priority rule, and wherein in response to uplink MAC PDU of the terminal device comprising the TYPE1 MAC CE, the TYPE1 MAC CE is the data with highest priority in the uplink data,
wherein the device is further caused to:
send, according to the first priority rule, the uplink MAC PDU preferentially in response to the MAC SDU in the uplink MAC PDU being prioritized in the uplink direction, and send the uplink MAC PDU preferentially according to the third priority rule, wherein the MAC SDU in the uplink MAC PDU being prioritized in the uplink direction comprises at least one of:

a priority value of a logical channel of the MAC SDU in the uplink MAC PDU being smaller than a first threshold; or the uplink MAC PDU is transmitted in a third message MESSAGE 3 in a random access process.

* * * * *